F. J. LARSEN.
PRESSURE REGULATING VALVE FOR PUMPS.
APPLICATION FILED OCT. 31, 1914.
1,196,121.
Patented Aug. 29, 1916.
2 SHEETS—SHEET 2.
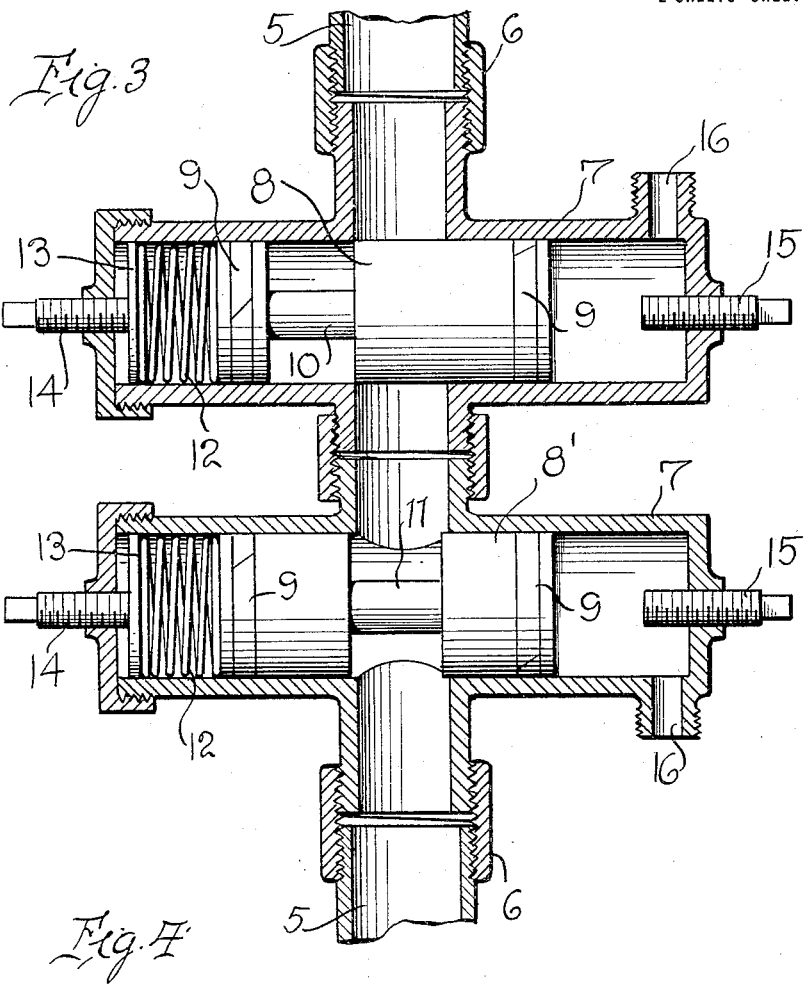
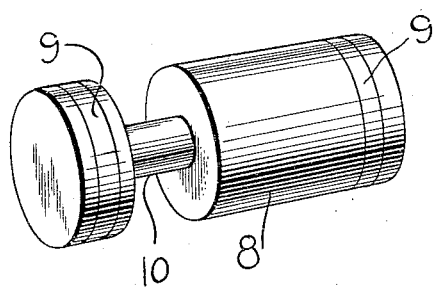
Inventor
F. J. Larsen

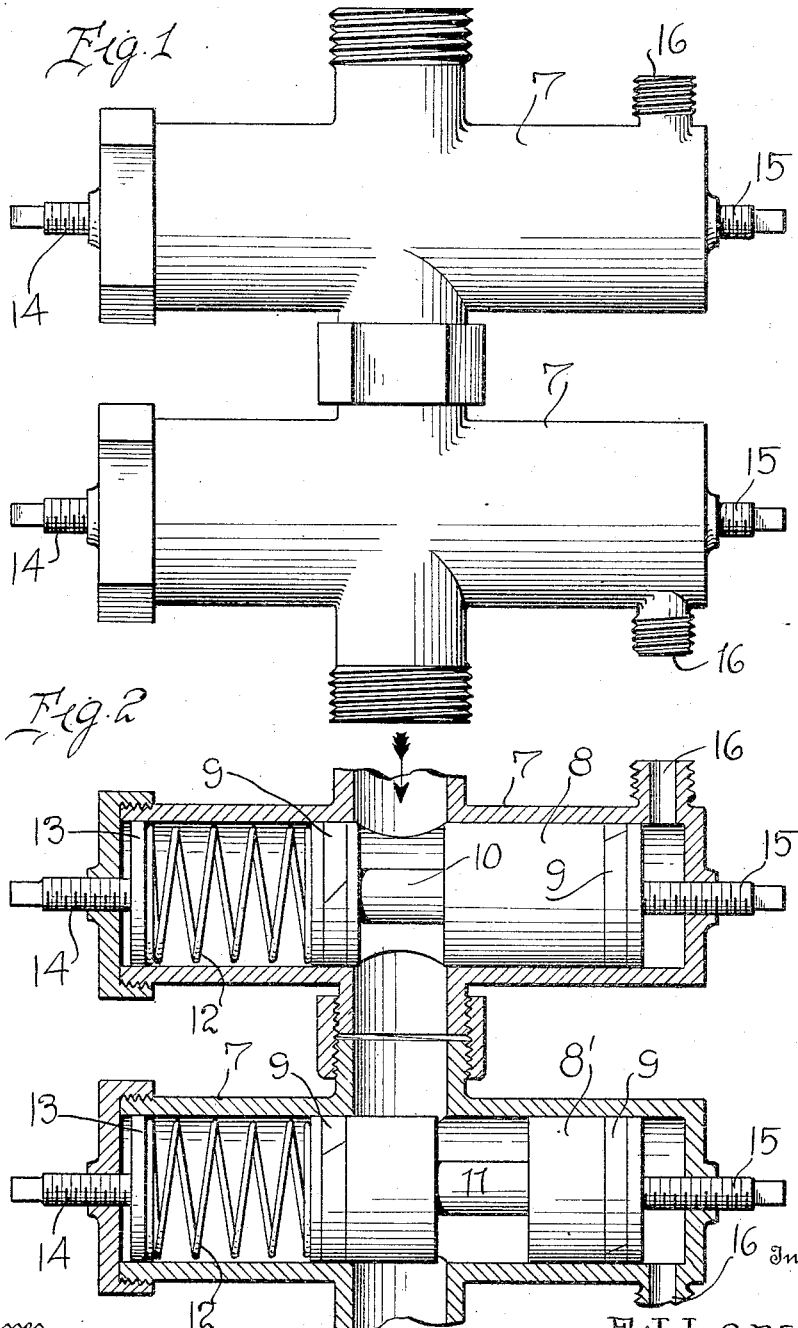

UNITED STATES PATENT OFFICE.

FRED J. LARSEN, OF GRAND ISLAND, NEBRASKA.

PRESSURE-REGULATING VALVE FOR PUMPS.

1,196,121.     Specification of Letters Patent.    Patented Aug. 29, 1916.

Application filed October 31, 1914. Serial No. 869,620.

*To all whom it may concern:*

Be it known that I, FRED J. LARSEN, a citizen of the United States, residing at Grand Island, in the county of Hall and State of Nebraska, have invented certain new and useful Improvements in Pressure-Regulating Valves for Pumps, of which the following is a specification, reference being had to the accompanying drawings.

This invention relates to an improved pressure regulating valve or governor for pumps and has for its primary object to provide a very simple and effective device of this character for increasing or diminishing the supply of steam or other actuating fluid in accordance with the discharge pressure of the pump.

More particularly stated, the invention has for its object to provide a pressure regulating valve interposed in the pipe supplying actuating fluid to the pump which will automatically cut off the supply of motive fluid upon a sudden reduction of pressure in the tank or reservoir below a minimum point, and whereby the supply of the motive fluid will be automatically varied and controlled in accordance with the gradually increasing tank pressure until such supply is completely cut off when the tank pressure reaches a maximum point.

My invention has for a further object to provide a pressure regulating valve for the above purpose, which is highly reliable and positive in its action, consists of comparatively few parts which are of simple form, and may be produced at small manufacturing cost.

With the above and other objects in view, my invention consists in the novel features of construction, combination, and arrangement of parts to be hereinafter more fully described, claimed, and illustrated in the accompanying drawings, in which, Figure 1 is an elevation illustrating a pressure regulating valve embodying the present invention; Fig. 2 is a longitudinal section of the same; Fig. 3 is a similar view showing the valves in reversed position; and Fig. 4 is a detail perspective view of one of the valve members.

Referring in detail to the drawings, 5 designates the steam supply pipe which is made up of a plurality of pipe sections coupled together as indicated at 6. To the contiguous sections of the steam supply pipe, the valve cylinders 7 are suitably secured, said cylinders extending at right angles to said pipe and upon opposite sides thereof. In each of the cylinders 7, a valve piston 8 and 8', respectively, is arranged, said piston being provided adjacent to its opposite ends with the usual expansible packing rings 9 for engagement with the cylinder wall. The piston 8 is provided adjacent to its inner end with a reduced portion 10 which is of appreciably less diameter than the diameter of the steam supply pipe. The other of the pistons 8' is also formed with a reduced portion 11 at a point substantially midway between its ends. In the corresponding ends of the two cylinders, coil springs 12 are disposed, said springs being of approximately the same diameter as the internal diameter of the cylinder and engaging at one of their ends against the end of the piston in said cylinder. The other or outer ends of these springs engage upon an adjustable bearing plate 13 to the center of which an adjusting screw 14 is connected. This adjusting screw is mounted in the end wall of the valve cylinder. The outer end of this screw is preferably of square or rectangular form for the convenient application of a wrench thereto. An adjustable screw 15 is also similarly mounted in the opposite end of the valve cylinder and acts as a stop to limit the movement of the piston in one direction.

The body wall of the valve cylinder in which the stop screw 15 is mounted, is formed with a nipple 16 to which a pipe extending from the discharge pipe of the pump or a receiving tank (not shown), is adapted to be connected.

When the pressure in the tank or reservoir is reduced to a minimum, of say one hundred pounds, by reason of leakage or the contents being withdrawn, the spring 12 will act to force the valve members to the position shown in Fig. 2 so that steam may pass through the connection between the valve casings and past the head 9 into the pump cylinder. It will be noted, however, that the head 9 is almost in position to fully cut off the supply of steam so that racing of the pump by such reduction of pressure, is obviated. As the pressure in the tank or reservoir increases above the minimum of one hundred pounds, this pressure entering the cylinders through the nipples 16 gradually forces the valves 8, 8' to the left, and when the maximum pressure is reached, the valve 8 will completely cut off the supply of steam or other motive fluid to the pump and stop the operation of the latter. This maximum tank pressure may be varied or regulated by the proper adjustment of the screws 14 which tension the springs 12. By properly adjusting the stop screw 15, it will be seen that the valve 8' may be permitted to move to its fully closed position or may remain slightly open. By adjusting the screws 14, the pressure exerted by the springs 12 upon the respective valve pistons may be regulated in accordance with the desired liquid pressure in the tank or reservoir.

From the foregoing description, taken in connection with the accompanying drawings, the construction, manner of operation, and several advantages of my invention will be fully and clearly understood.

My improved regulating valve is entirely automatic in its action and regulates the volume of steam or other motive fluid passing to the pump exactly in accordance with the pressure in the tank or reservoir, and by the arrangement of the valves as shown, the overloading of the tank beyond a predetermined maximum pressure is obviated.

The device itself is extremely simple in its construction and it will, therefore be appreciated that the same will not readily get out of order and may be maintained in operative condition at small expense.

While I have shown and described the preferred construction and arrangement of the several elements employed, it will be understood that the invention is susceptible of considerable modification therein, and I therefore reserve the privilege of resorting to all such legitimate changes as may be fairly embodied within the spirit and scope of the invention as claimed.

Having thus fully described my invention, what I desire to claim and secure by Letters Patent is:—

1. A pressure regulating valve for pumps including, in combination with a steam supply pipe, spaced valve cylinders connected in said supply pipe, said cylinders being adapted to be connected at one of their ends to the discharge pipe of the pump, a valve piston in each of said cylinders, springs arranged in the other ends of the cylinders co-acting with the respective pistons to yieldingly hold the same against movement under the fluid pressure admitted to the opposite end of the cylinder, said valve pistons having reduced portions at relatively opposite points with respect to their ends, one of said pistons operating to close the supply upon an increase above a predetermined discharge pressure and the other piston closing the supply upon a decrease below the said predetermined discharge pressure.

2. A pressure regulating valve for pumps including, in combination with a steam supply pipe, spaced valve cylinders connected in said supply pipe, said cylinders being adapted to be connected at one of their ends to the discharge pipe of the pump, a valve piston in each of said cylinders, springs arranged in the other ends of the cylinders co-acting with the respective pistons to yieldingly hold the same against movement under the fluid pressure admitted to the opposite end of the cylinder, said valve pistons having reduced portions at relatively opposite points with respect to their ends, one of said pistons operating to close the supply upon an increase above a predetermined discharge pressure and the other piston closing the supply upon a decrease below the said predetermined discharge pressure, and adjustable stop members mounted in the first named end of each valve cylinder to limit the movement of the piston therein under the action of said spring.

3. A pressure regulating valve for pumps including, in combination with a steam supply pipe, spaced valve cylinders connected in said pipe and extending at right angles thereto, the corresponding ends of said cylinders adapted to be connected to the discharge pipe of the pump, a valve piston in each of the cylinders, a spring arranged in the other end of each cylinder to yieldingly hold the piston against movement in one direction, means for adjusting the tension of said spring, each of said valves having a reduced portion, such reduced portions of the valves being located at relatively different points with respect to the ends of the valve and with respect to each other, one of said pistons operating to close the supply upon an increase above a predetermined discharge pressure and the other piston closing the supply upon a decrease below the said predetermined discharge pressure, and adjustable stop screws mounted in the said ends of the cylinders to limit the movement of the valve pistons under the action of said springs.

In testimony whereof I hereunto affix my signature in the presence of two witnesses.

FRED J. LARSEN.

Witnesses:
L. R. BRININGER,
A. J. SWINDEL.